(12) United States Patent
Hsu et al.

(10) Patent No.: US 11,422,413 B2
(45) Date of Patent: Aug. 23, 2022

(54) MANUFACTURING EQUIPMENT OF LOW-TEMPERATURE FORMED LIQUID CRYSTAL ALIGNMENT FILM AND PANEL MANUFACTURING PROCESS APPLICATION THEREOF

(71) Applicant: MAT.W Global Co., Ltd., Taoyuan (TW)

(72) Inventors: Tzu-Lan Hsu, Taichung (TW); Yu-Ting Pen, Taichung (TW)

(73) Assignee: MAT.W GLOBAL CO., LTD., Taoyuan (TW)

( * ) Notice: Subject to any disclaimer, the term of this patent is extended or adjusted under 35 U.S.C. 154(b) by 0 days.

(21) Appl. No.: 17/071,718

(22) Filed: Oct. 15, 2020

(65) Prior Publication Data

US 2022/0121067 A1  Apr. 21, 2022

(51) Int. Cl.
*G02F 1/1337* (2006.01)
*G02F 1/1679* (2019.01)
*G02F 1/16755* (2019.01)
*G02F 1/1333* (2006.01)

(52) U.S. Cl.
CPC .. *G02F 1/133788* (2013.01); *G02F 1/133377* (2013.01); *G02F 1/133707* (2013.01); *G02F 1/1679* (2019.01); *G02F 1/16755* (2019.01); *C09K 2323/00* (2020.08); *C09K 2323/02* (2020.08); *C09K 2323/06* (2020.08); *G02F 1/133305* (2013.01)

(58) Field of Classification Search
CPC ......... G02F 1/133788; G02F 1/133377; G02F 1/133707; G02F 1/16755; G02F 1/1679; G02F 1/133305; C09K 2323/00; C09K 2323/02; C09K 2323/06
USPC ................... 428/1.1, 1.2; 430/311, 322, 321; 349/153
See application file for complete search history.

(56) References Cited

U.S. PATENT DOCUMENTS 6,166,797 A * 12/2000 Bruzzone ............ G02F 1/13394
349/155
2005/0099575 A1 * 5/2005 Liang .................. G02F 1/13475
349/153

* cited by examiner

*Primary Examiner* — Ruiyun Zhang
(74) *Attorney, Agent, or Firm* — Muncy, Geissler, Olds & Lowe, P.C.

(57) ABSTRACT

Manufacturing equipment of low-temperature formed liquid crystal alignment film and panel manufacturing process thereof are provided. The manufacturing equipment includes an engraving member, a light curing agent coating member, and a light curing device. In the panel manufacturing process, the engraving member is applied for engraving an alignment pattern on a surface of a prepared substrate. Next, the light curing agent coating member coats the light curing agent on the surface of the substrate having the alignment pattern thereon. Then, the light curing device is applied for light curing the light curing agent, so as to form a crystal alignment film having a texture of the alignment pattern. Finally, liquid crystal is injected between two substrates having the liquid crystal alignment film and encapsulating the structure to form a panel.

6 Claims, 7 Drawing Sheets

MANUFACTURING EQUIPMENT OF LOW-TEMPERATURE FORMED LIQUID CRYSTAL ALIGNMENT FILM AND PANEL MANUFACTURING PROCESS APPLICATION THEREOF

BACKGROUND OF THE INVENTION

1. Field of the Invention

The present invention relates to manufacturing process of liquid crystal panels, and more particularly, to a manufacturing equipment of low-temperature formed liquid crystal alignment film and panel manufacturing process application thereof.

2. Description of the Related Art

Figure 1:
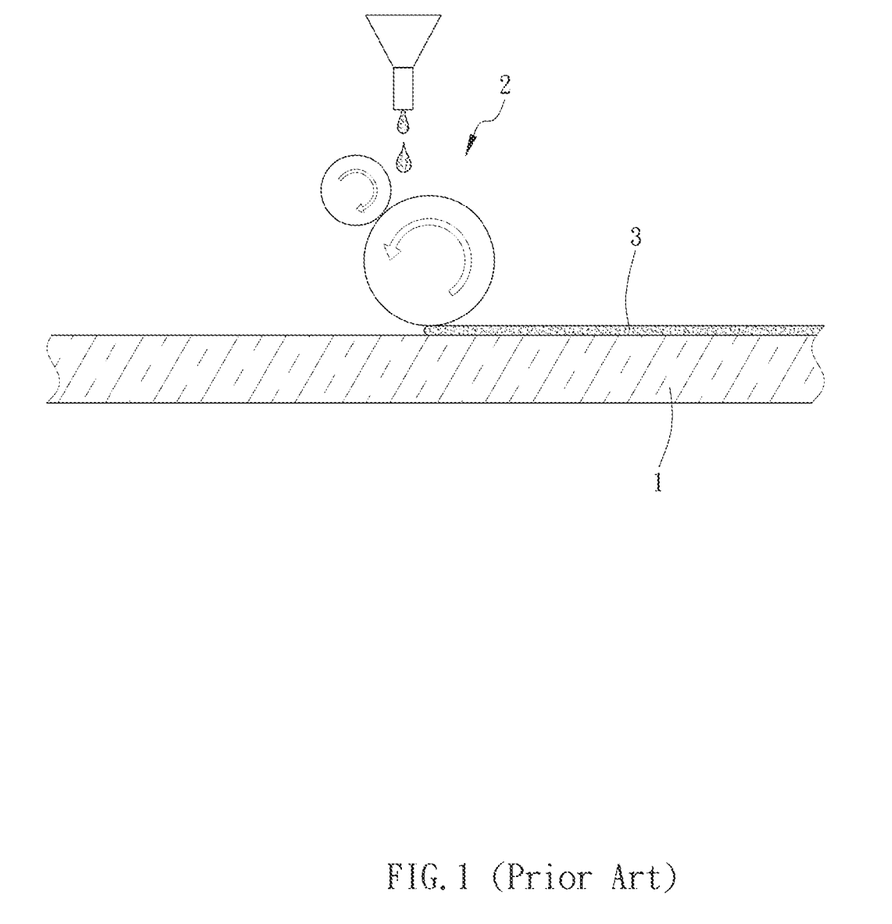
FIG. 1 is a schematic view illustrating the conventional coating process of polyimide on substrate.
Figure 2:
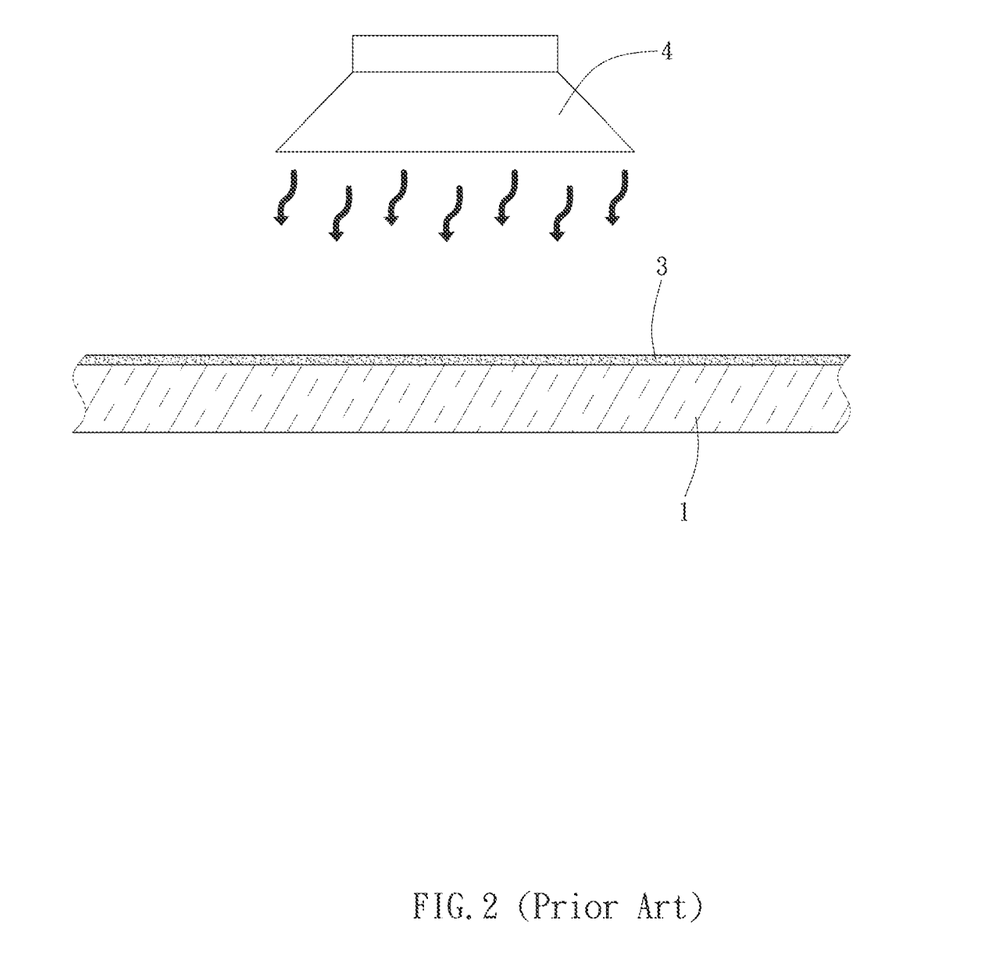
FIG. 2 is a schematic view illustrating the conventional solidification process of polyimide on the substrate surface by use of baking equipment.
Figure 3:
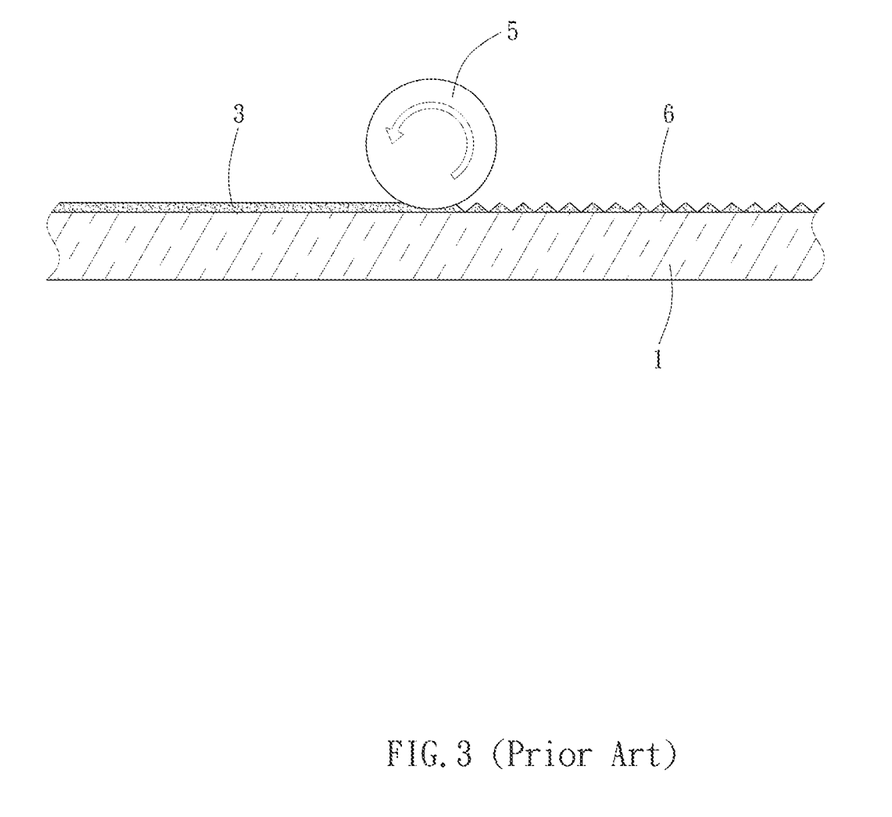
FIG. 3 is a schematic view illustrating the conventional process of forming the liquid crystal alignment film by solidifying the polyimide on the substrate surface with a flannel roller.

In the alignment manufacturing process of the panel of a conventional liquid crystal display (LCD), referring to FIG. 1, the surface of a substrate 1, which is formed of a glass material, is coated with polyimide (PI) 3 by the coating member 2. Subsequently, referring to FIG. 2, the polyimide 3 undergoes a heating and baking process carried out by the baking equipment 4 to be solidified. Then, referring to FIG. 3, the polyimide 3 is rubbed with a flannel roller 5, such that the surface of the solidified polyimide 3 is provided with an alignment pattern, thereby forming a liquid crystal alignment film 6. With such method, the molecules of the liquid crystal alignment film 6 are arranged in a consistent direction, so as to achieve the liquid crystal displaying effect by controlling the light and dark of the light beam. However, the temperature for baking ranges from at least 120 to 230 Celsius degrees. Therefore, the baking equipment 4 is a must which is unable to be omitted. As a result, the equipment cost remains relatively high.

Further, in the conventional manufacturing process, the coated polyimide 3 needs to be baked to at least 120 Celsius degrees for solidification. However, if the substrate 1 is formed of a flexible material instead of the aforementioned glass material, the substrate 1 is possibly deformed and damaged due to the high temperature baking process. Obviously, the substrate formed of flexible material is not suitable for the conventional manufacturing process. It is desirable for resolving such issues.

SUMMARY OF THE INVENTION

To improve the issues above, a manufacturing equipment of low-temperature formed liquid crystal alignment film and panel manufacturing process application thereof are disclosed, wherein the crystal alignment film is solidified under a relatively lower temperature.

For achieving the aforementioned objectives, a manufacturing equipment of low-temperature formed liquid crystal alignment film is provided, comprising an engraving member, a light curing agent coating member, and a light curing device. The light curing agent coating member is disposed after the engraving member. The light curing device is disposed after the light curing agent coating member. Therein, the engraving member is applied for engraving an alignment pattern on a surface of a substrate. The light curing agent coating member is applied for coating a light curing agent on the surface having the alignment patter. The light curing device is applied for lighting curing the light curing agent to form a solidified crystal alignment film having a texture formed according to the alignment pattern.

Preferably, when the engraving member engraves the alignment pattern on the surface of the substrate, the engraving member simultaneously engraves an interstitial on the surface, A manufacturing process of panel using a low-temperature formed liquid crystal alignment pattern, comprising following steps: (a) preparing a substrate; (b) engraving an alignment pattern on a surface of the substrate with an engraving member; (c) coating a light curing agent on the surface of the substrate having the alignment pattern; (d) light curing the light curing agent with a light curing device to form a liquid crystal alignment film which is formed in accordance with the alignment pattern; and (e) injecting a liquid crystal between two substrates having the liquid crystal alignment film and packaging the liquid crystal to form a panel.

Preferably, the substrate is a soft and flexible film formed of plastic material.

Preferably, when the engraving member engraves the alignment pattern on the surface of the substrate, the engraving member simultaneously engraves an interstitial on the surface, so as to form a gap between two substrates having the liquid crystal alignment film for injection of liquid crystal therein.

Preferably, after the liquid crystal is injected between the two substrates, an injection inlet of the liquid crystal undergoes a low degree vacuuming process before packaging to form the panel.

Preferably, the light curing device carries out the light curing process on the light curing agent under a temperature ranging from 25 to 70 Celsius degrees.

Preferably, the engraving member is a roller having a texture corresponding to the alignment pattern.

Preferably, the engraving member is a heat pressing mold having a texture corresponding to the alignment pattern.

With such configuration, for solidification of the liquid crystal alignment film of the present invention, the engraving member engraves the alignment pattern of the surface of the substrate, with the light curing agent being coated thereon, and the light curing device is applied for solidifying the light curing agent. During the solidification process of the liquid crystal alignment film, the heating and baking process is omitted, so that the heating and baking equipment is omitted, thereby saving cost of equipment.

Also, if the substrate is formed of soft and flexibly material, because the light curing device carries out the light curing process under a relatively lower temperature, the substrate of the liquid crystal alignment film is prevented from deformation and damage during the solidification. Therefore, the liquid crystal alignment film is able to be manufactures of the substrate formed of flexible material.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 4 to FIG. 7, a manufacturing equipment of low-temperature formed liquid crystal alignment film and panel manufacturing process application thereof are provided. The manufacturing equipment in the present invention refers to partial equipment during the panel manufacturing process. The equipment in the present invention is mainly applied for forming the liquid crystal alignment film in the liquid crystal alignment manufacturing process. The panel manufacturing process, besides the aforementioned manufacturing equipment of low-temperature formed liquid crystal alignment film, further comprises other equipment needed during the panel manufacturing process. Because the present invention aims at the improvement of manufacturing process of the liquid crystal alignment film, other equipment needed in the panel manufacturing process are omitted herein.

The manufacturing equipment of low-temperature formed liquid crystal alignment film comprises an engraving member 10, a light curing agent coating member 20, and a light curing device 30. For the arrangement of the manufacturing process equipment, the light curing agent coating member 20 is disposed after the engraving member 10, and the light curing device 30 is disposed after the light curing agent coating member 20. Thus, the engraving member 10, the light curing agent coating member 20, and the light curing device 30 are arranged according to the manufacturing process of the liquid crystal alignment film.

The aforementioned manufacturing process of low-temperature formed liquid crystal film comprises following steps.

A substrate 40 is prepared. In the embodiment, the substrate 40 is a soft and flexible film formed of a plastic material, such as a polymer, plastic, or polymethyl methacrylate (PMMA). In the embodiment, the material is a polymer. In the embodiment, the substrate 40 is soft and flexible, so that the substrate 40 is able to be deliver in a roll to roll (R2R) manner, which is different from the single piece delivering manner of conventional substrates that are formed of glass material.

Figure 4:
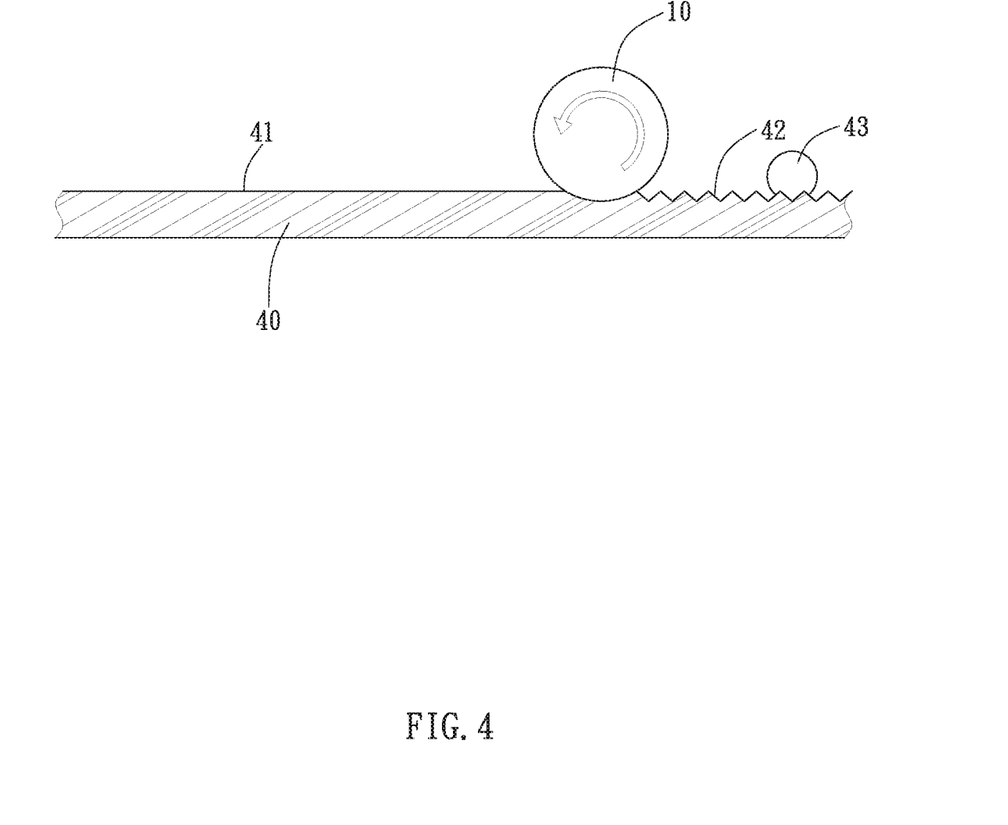
FIG. 4 is a schematic view illustrating the engraving member engraving the alignment pattern and interstitial on the surface of the substrate in accordance with an embodiment of the present invention.

After the substrate 40 is prepared, the engraving member 10 is applied for engraving the alignment pattern 42 on the surface 41 of the substrate 40 (as shown by FIG. 40). In the drawings, the alignment pattern 42 is represented by a zigzag structure. In the embodiment, the engraving member 10 is a roller having a texture corresponding to the alignment pattern 42. However, the engraving member 10 of the present invention is not limited to the aforementioned roller. In different embodiments, the engraving member 10 is able to be a heat pressing mold (not shown) having a texture corresponding to the alignment pattern 42. Further, in the embodiment, when the engraving member 10 engraves the alignment pattern 42 on the surface 41 of the substrate 40, an interstitial 43 is also engraved on the surface 41.

Figure 5:
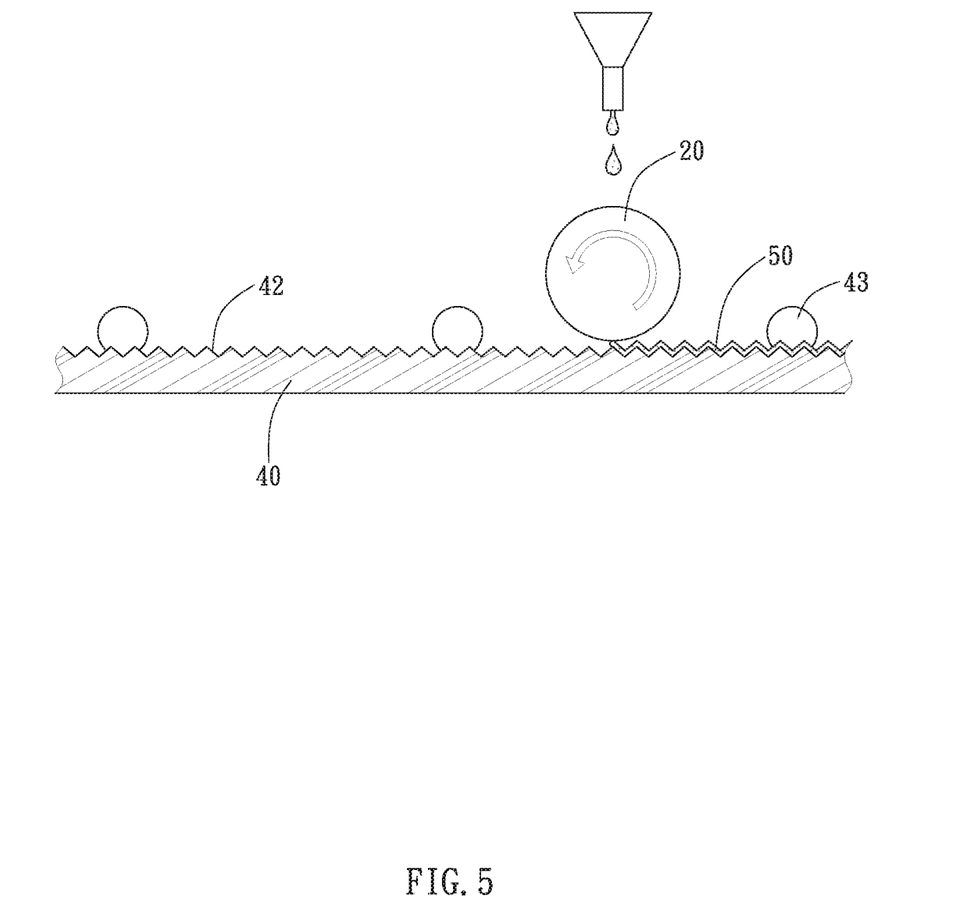
FIG. 5 is a schematic view illustrating the light curing agent coating member coating the light curing agent on the alignment pattern on the substrate surface in accordance with an embodiment of the present invention.

After the alignment pattern 42 is engraved on the surface 41 of the substrate 40, the light curing agent coating member 20 coated a light curing agent 50 on the surface 41 of the substrate 40 (as shown by FIG. 5); in other words, the light curing agent 50 is coated on the alignment pattern 42, wherein the light curing agent 50 is presented as a zigzag shaped in accordance with the alignment pattern 42. In the embodiment, the light curing agent coating member 20 is a roller, which is applied for rolling on the surface 41 of the substrate 40, so as to evenly coat the light curing agent 50 on the surface 41 of the substrate 40 during the rolling process. The light curing agent 50, in the embodiment, is a UV resin.

Figure 6:
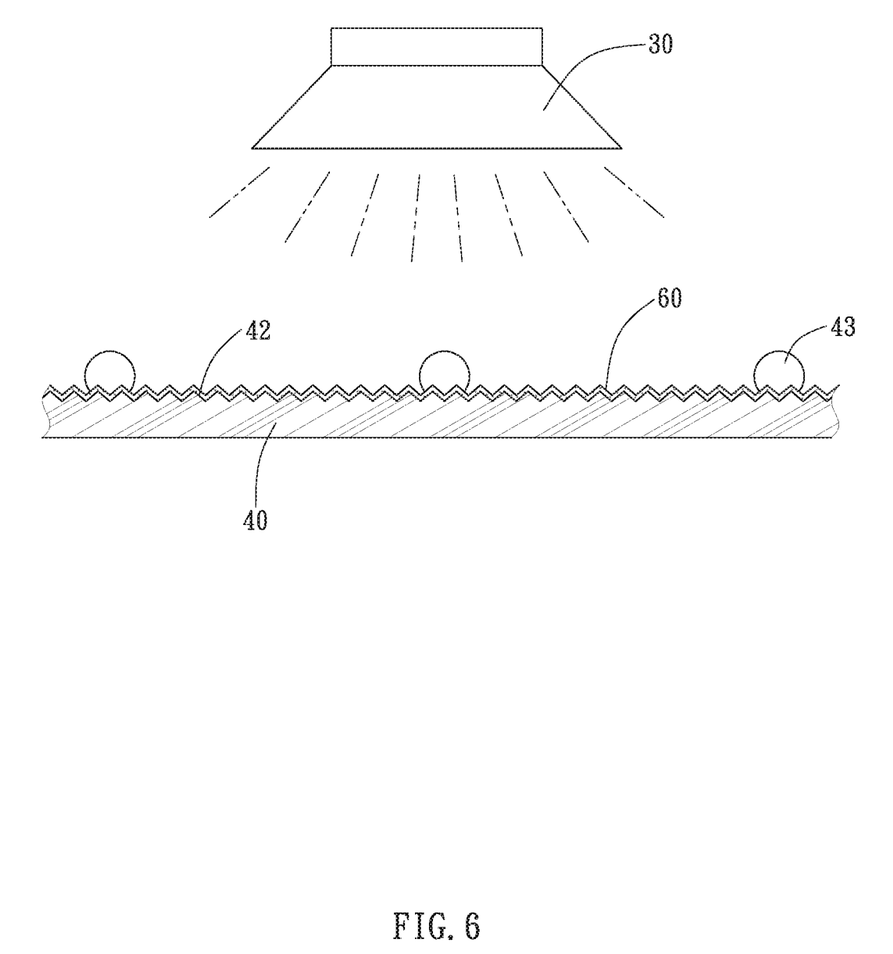
FIG. 6 is a schematic view illustrating the light curing device carrying out the light curing solidification process on the light curing agent coated on the alignment pattern on the substrate surface in accordance with an embodiment of the present invention.

After the light curing agent 50 is coated on the alignment pattern 42, the light curing device 30 is applied for light curing the light curing agent 50 to form a liquid crystal alignment film 60 (as shown by FIG. 6), whereby the liquid crystal alignment film 60 is solidified to have a texture in accordance with the alignment pattern 42. The light curing device 30, in the embodiment, is an UV light illumination device, which is applied for providing UV light irradiation on the light curing agent 50 for a period of time, such that the light curing agent 50 is solidified to form the liquid crystal alignment film 60 having a texture in accordance with the alignment pattern 42. During the operation of the light curing device 30, the light generated thereby ranges from the room temperature at about 25 Celsius degrees, which is the relatively lower temperature thereof, to about 70 Celsius degrees, which is the relatively higher temperature thereof, and such range of temperature is sufficient for facilitating the solidification of the liquid crystal alignment film 60.

Figure 7:
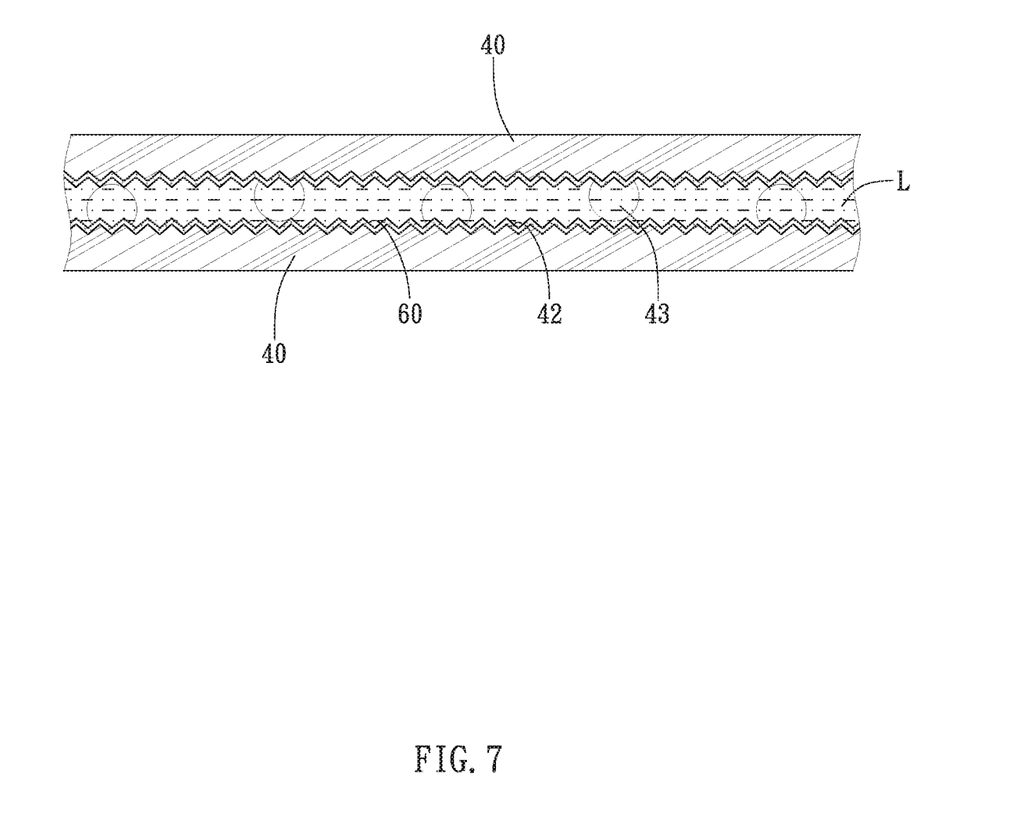
FIG. 7 is a schematic view illustrating the liquid crystal being injected between two substrates to form a panel.

After the surface 41 of the substrate 40 provided with the solidified liquid crystal alignment film 60, the liquid crystal can be injected therein. In this step, two substrates 40 having the liquid crystal alignment film 60 are stacked, by which the interstitials 43 engraved on the surface 41 of the substrates 40 cause a gap to be formed between the two substrates 40, so that the liquid crystal L is able to be injected into the gap (as shown by FIG. 7) from an injection inlet (not shown). Next, the packaging process is carried out to form a panel. In the embodiment, after the liquid crystal L is injected between the two substrates 40 having the liquid crystal alignment film 60, the injection inlet of the liquid crystal L undergoes a low degree vacuuming process, thereby discharging air bubbles produced during the injection of the liquid crystal L before the packaging process of forming the panel.

With the foregoing configuration, advantages of the present invention will be illustrated below.

Regarding the liquid crystal alignment film 60 in accordance with the present invention, the engraving member 10 is applied for engraving the alignment pattern 42 on the surface 41 of the substrate 40, and the light curing agent 50 is coated on the alignment pattern 42, and the light curing device 30 is applied for light curing the light curing agent 50, so as to solidify the liquid crystal alignment film 60. Compared with the manufacturing process of the conventional liquid crystal alignment film, the present invention forms the light curing agent 50 into the liquid crystal alignment film 60 by the light curing manner, in which the baking device in the conventional manufacturing process is not needed. Therefore, the relatively high cost of the heating and baking device is saved, thereby lowering the cost of manufacturing equipment.

In the aforementioned embodiment, the substrate 40 is formed of a soft and flexible material. When the light curing device 30 is applied for light curing the light curing agent 50, the temperature for forming the liquid crystal alignment film 60 (ranging from 25 to 70 Celsius degrees in the embodiment) is relatively lower than the temperature of the conventional heating and baking equipment which is between 120 to 230 Celsius degrees. Therefore, during the solidification process of the liquid crystal alignment film 60, the substrate 40 is prevented from deformation and damage due to high temperature. Therefore, the manufacturing equipment and manufacturing process of the low-temperature formed liquid crystal alignment film of the present invention are applicable for manufacturing liquid crystal alignment film 60 on the substrate 40 which is formed of a soft and flexible material.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A manufacturing process of panel using a low-temperature formed liquid crystal alignment pattern, comprising following steps:

(a) preparing a substrate;
(b) engraving an alignment pattern for liquid crystal alignment on a surface of the substrate with an engraving member;
(c) coating a light curing agent on the surface of the substrate having the alignment pattern;
(d) light curing the light curing agent with a light curing device to form a liquid crystal alignment film which is formed in accordance with the alignment pattern; and
(e) injecting a liquid crystal between two substrates having the liquid crystal alignment film and packaging the liquid crystal to form a panel.

2. The manufacturing process of claim 1, wherein the substrate is a soft and flexible film formed of a plastic material.

3. The manufacturing process of claim 2, wherein when the engraving member engraves the alignment pattern on the surface of the substrate, an interstitial space is engraved on the surface of the substrate as well, so as to form a gap for injection of the liquid crystal between the two substrates.

4. The manufacturing process of claim 3, wherein after the liquid crystal is injected between the two substrates, an injection inlet of the liquid crystal undergoes a low degree vacuuming process before packaging to form the panel.

5. The manufacturing process of claim 2, wherein the light curing device light cures the light curing agent under a temperature condition of 25 to 70 Celsius degrees.

6. The manufacturing process of claim 1, wherein the engraving member is a roller or a heat pressing mold having a texture in accordance with the alignment pattern.

* * * * *